(12) United States Patent
Jordan

(10) Patent No.: US 8,485,320 B2
(45) Date of Patent: Jul. 16, 2013

(54) BICYCLE BRAKE

(75) Inventor: Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 12 days.

(21) Appl. No.: 13/006,183

(22) Filed: Jan. 13, 2011

(65) Prior Publication Data

US 2012/0181120 A1    Jul. 19, 2012

(51) Int. Cl.
*B62L 1/06*   (2006.01)

(52) U.S. Cl.
USPC .......................... 188/24.13; 188/28; 188/2 D

(58) Field of Classification Search
USPC .......... 188/24.12, 24.13, 24.14, 24.15, 24.22, 188/2 D, 26, 28
See application file for complete search history.

(56) References Cited

U.S. PATENT DOCUMENTS

| | | | |
|---|---|---|---|
| 3,628,635 A | 12/1971 | Yoshigai | |
| 4,290,507 A * | 9/1981 | Brown | 188/24.15 |
| 5,143,189 A * | 9/1992 | Meier-Burkamp | 192/64 |
| 7,000,739 B2 | 2/2006 | Ciamillo | |
| 7,422,090 B1 | 9/2008 | Preuss | |
| 2009/0038894 A1 | 2/2009 | Liu et al. | |

FOREIGN PATENT DOCUMENTS

CN    1097389 A  *  1/1995

\* cited by examiner

*Primary Examiner* — Thomas J Williams
(74) *Attorney, Agent, or Firm* — Milan Milosevic; Lisa Serdynski; Steven Courtright

(57) ABSTRACT

A bicycle brake actuated by a control cable has a first main brake arm and a second main brake arm mounted for pivotable movement with respect to the first main brake arm. A first transfer brake arm is pivotally connected to the first main brake arm, and a second transfer brake arm is pivotally connected to the first transfer brake arm and pivotally connected to the second main brake arm. The first main brake arm has a cable guide for receiving the control cable. The first transfer brake arm has a cable anchor for receiving the control cable, the control cable extending between the cable guide and the cable anchor. The first main brake arm and second main brake arm each support a brake shoe and apply braking force to a wheel when actuated.

17 Claims, 5 Drawing Sheets

BICYCLE BRAKE

BACKGROUND

1. Field of the Invention

The invention pertains to vehicles such as bicycles, and to brake systems for bicycles.

2. Description of Related Art

Bicycle braking systems are known in the art. Some of these systems are cable actuated and utilize a caliper system mounted to a frame or fork of the bicycle. The caliper system has two pivoting main arms, each supporting a brake pad positioned on opposing sides of the wheel rim. Actuation of the cable causes the arms to pivot about a mounting point(s) such that the brake pads move together toward each other to apply a braking force to the wheel.

SUMMARY

In light of the present need for bicycle brakes, a brief summary of various exemplary embodiments is presented. Some simplifications and omissions may be made in the following summary, which is intended to highlight and introduce some aspects of the various exemplary embodiments without limiting the scope of the invention. Detailed descriptions of a preferred exemplary embodiment adequate to allow those of ordinary skill in the art to make and use the inventive concepts will follow in later sections.

In one embodiment, a bicycle brake actuated by a control cable comprises: a first main brake arm having a cable guide for receiving the control cable; a second main brake arm mounted for pivotable movement with respect to the first main brake arm; a first transfer brake arm pivotally connected to the first main brake arm, the first transfer brake arm having a cable anchor for receiving the control cable, the control cable extending between the cable guide and the cable anchor; and a second transfer brake arm pivotally connected to the first transfer brake arm and pivotally connected to the second main brake arm.

In another embodiment, a bicycle brake for use with a control cable including a cable housing and a brake cable slidably disposed within the cable housing comprises: a first main brake arm; a second main brake arm mounted for pivotable movement with respect to the first main brake arm; a first transfer brake arm pivotally connected to the first main brake arm; and a second transfer brake arm pivotally connected to the first transfer brake arm, and pivotally connected to the second main brake arm. The first transfer brake arm also comprises a cable anchor that releasably retains the brake cable, wherein the pivotal connection between the second transfer brake arm and the first transfer brake arm is disposed on the first transfer brake arm between (i) the pivotal connection of the first transfer brake arm to the first main brake arm and (ii) the cable anchor. The first main brake arm has a cable guide that retains the cable housing and allows the brake cable to extend through the cable guide to the cable anchor. The first main brake arm has a first mounting bore and the second main brake arm has a second mounting bore and a fastener passes through the first mounting bore and the second mounting bore to fasten the bicycle brake to a bicycle frame. The first main brake arm has a first end that supports a first brake shoe, the second main brake arm has a second end that supports a second brake shoe, and the second mounting bore is disposed between (i) the second end of the second main brake arm and (ii) the pivotal connection of the second transfer brake arm to the second main brake arm.

BRIEF DESCRIPTION OF THE DRAWINGS

In order to better understand various exemplary embodiments, reference is made to the accompanying drawings, wherein.

DETAILED DESCRIPTION

Figure 1:
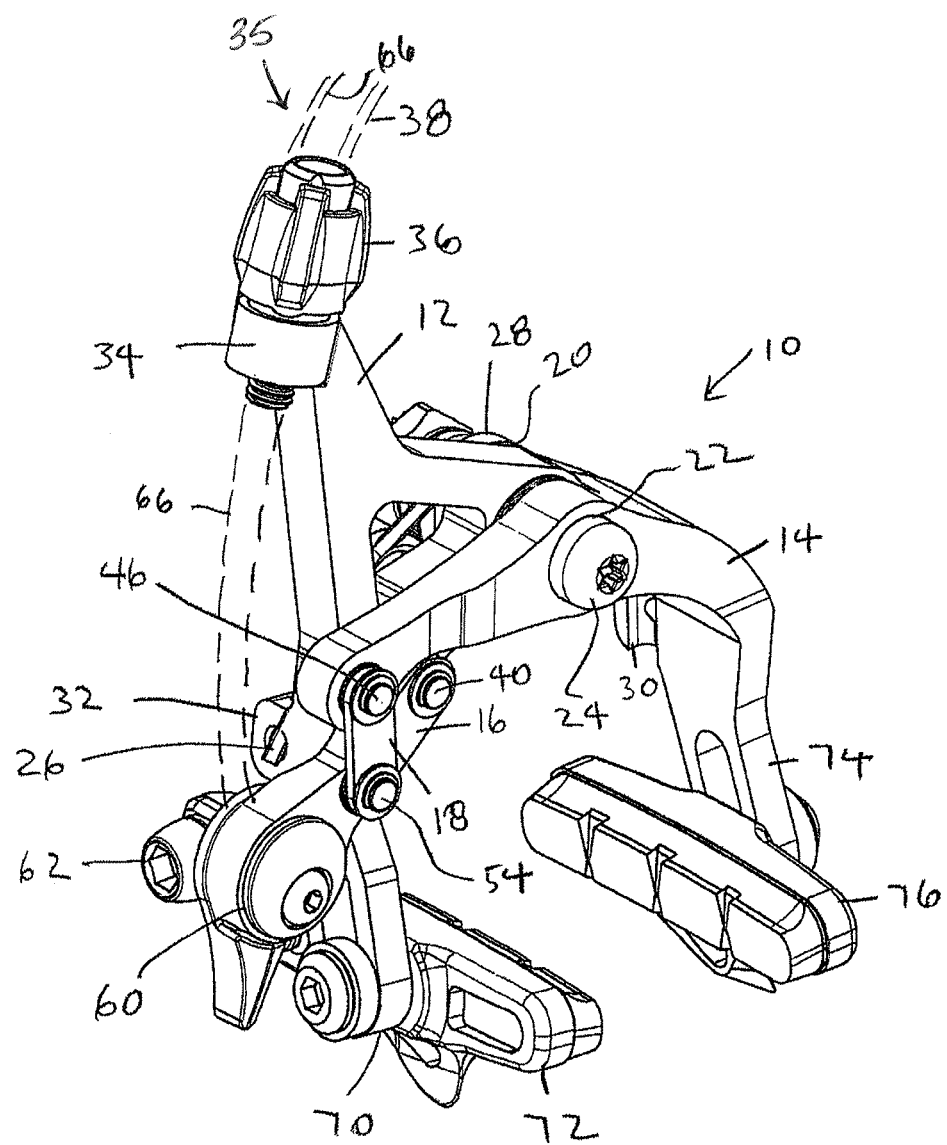
FIG. 1 is a front perspective view of a bicycle brake according to an embodiment of the present invention.
Figure 2:
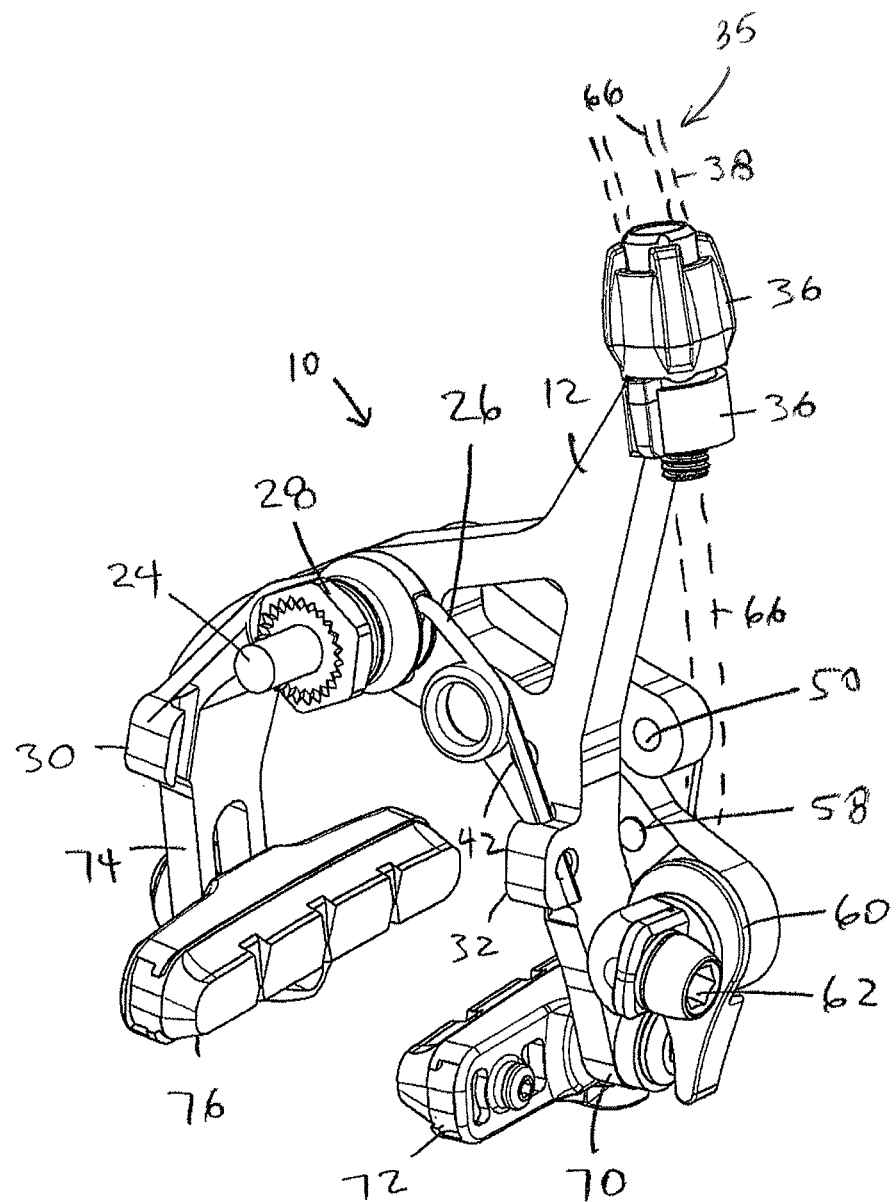
FIG. 2 is a rear perspective view of the bicycle brake.
Figure 3:
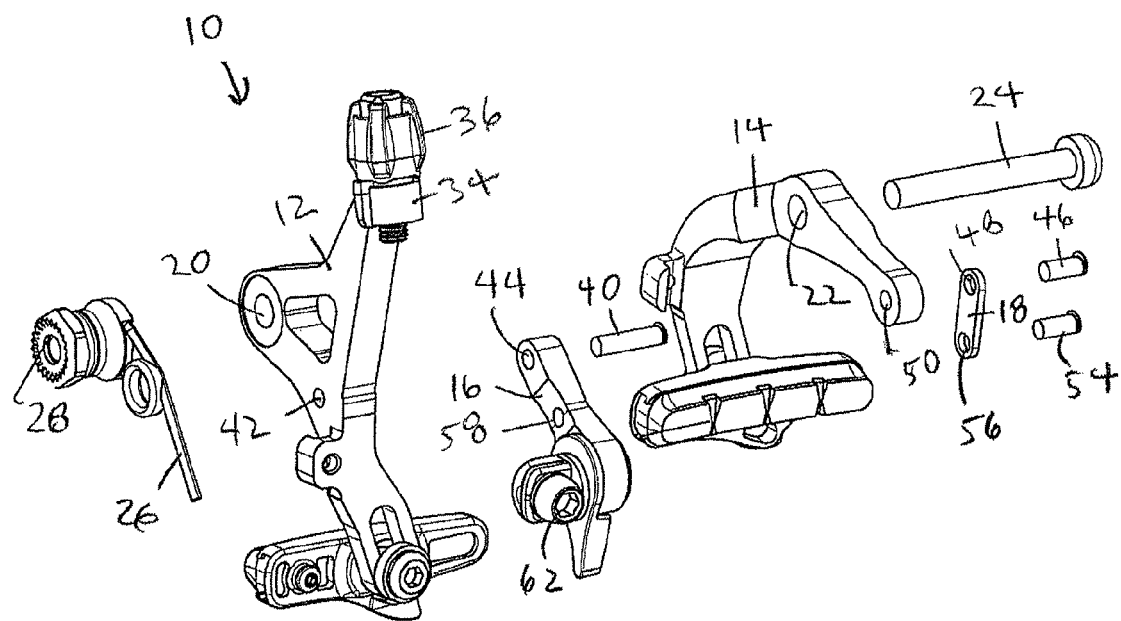
FIG. 3 is a rear exploded view of the bicycle brake.

Some embodiments of the invention will now be explained with reference to the drawing figures. Referring to FIGS. 1-3, a bicycle brake 10 is shown. The bicycle brake 10 includes a first main brake arm 12 and a second main brake arm 14. The bicycle brake also includes a first transfer brake arm 16 and a second transfer brake arm 18. The first main brake arm 12 has a first mounting bore 20 and the second main brake arm 14 has a second mounting bore 22 which permit the brake arms to be mounted to the frame of a bicycle. In this embodiment, a single fastener or mounting bolt 24 passes through the bores 20 and 22 and is fastened to the bicycle frame. A bias spring 26 is attached to a grommet 28 which the mounting bolt 24 also passes through. The mounting bolt 24 supports the bias spring 26 so that its respective ends contact a spring mounting boss 30 on the first main brake arm 12 and a spring mounting boss 32 on the second main brake arm 14. The bias spring 26 therefore biases the first and second main brake arms 12 and 14, and their respective brake pads 72, 76, apart from each other. The first main brake arm 12 has a cable guide 34 which receives a control cable 35, in this embodiment a Bowden-type cable. The control cable 35 includes a cable housing 38 and a brake cable 66 slidably disposed in the cable housing 38. The cable guide 34 includes a seat that retains the cable housing 38 and allows the brake cable 66 to extend through the cable guide 34. The cable guide 34 includes a barrel adjuster 36 for adjusting the length of the brake cable 66.

The first transfer brake arm 16 is pivotally connected to the first main brake arm 12 by a first pivot pin 40 extending through a bore 42 in the first main brake arm 12 and a bore 44 in the first transfer brake arm 16. The second transfer brake arm 18 is connected to the second main brake arm 14 by a second pivot pin 46 extending through a bore 48 in the second main brake arm 14 and a bore 50 in the second main brake arm 14. A second transfer brake arm 18 is connected to the first transfer brake arm 16 by a third pivot pin 54 which extends through a bore 56 in the second transfer brake arm 18 and a bore 58 in the first transfer brake arm 16. The first transfer brake arm 16 therefore is pivotally connected to both the first main brake arm 12 and to the second transfer brake arm 18.

The first transfer brake arm 16 has, at its projecting end, a cable engaging feature that engages the brake cable 66 so that brake cable force is transferred to the first transfer brake arm 16. In this embodiment, the first transfer brake arm 16 has an aperture 60 therethrough. The aperture 60 serves as a female cable bore that receives a cable anchor 62. The cable anchor 62 is a clamp that retains an end portion of the brake cable 66. The cable anchor 62 may be of a quick release type that can quickly latch on to or release the cable 66. Alternatively, the first transfer brake arm 16 has the cable guide 34 and the first main brake arm 12 has the cable anchor 62.

The first main brake arm 12 terminates in a lower extension 70 which supports a brake pad 72. The second main brake arm 14 terminates in a lower extension 74 which supports a brake pad 76.

Figure 4:
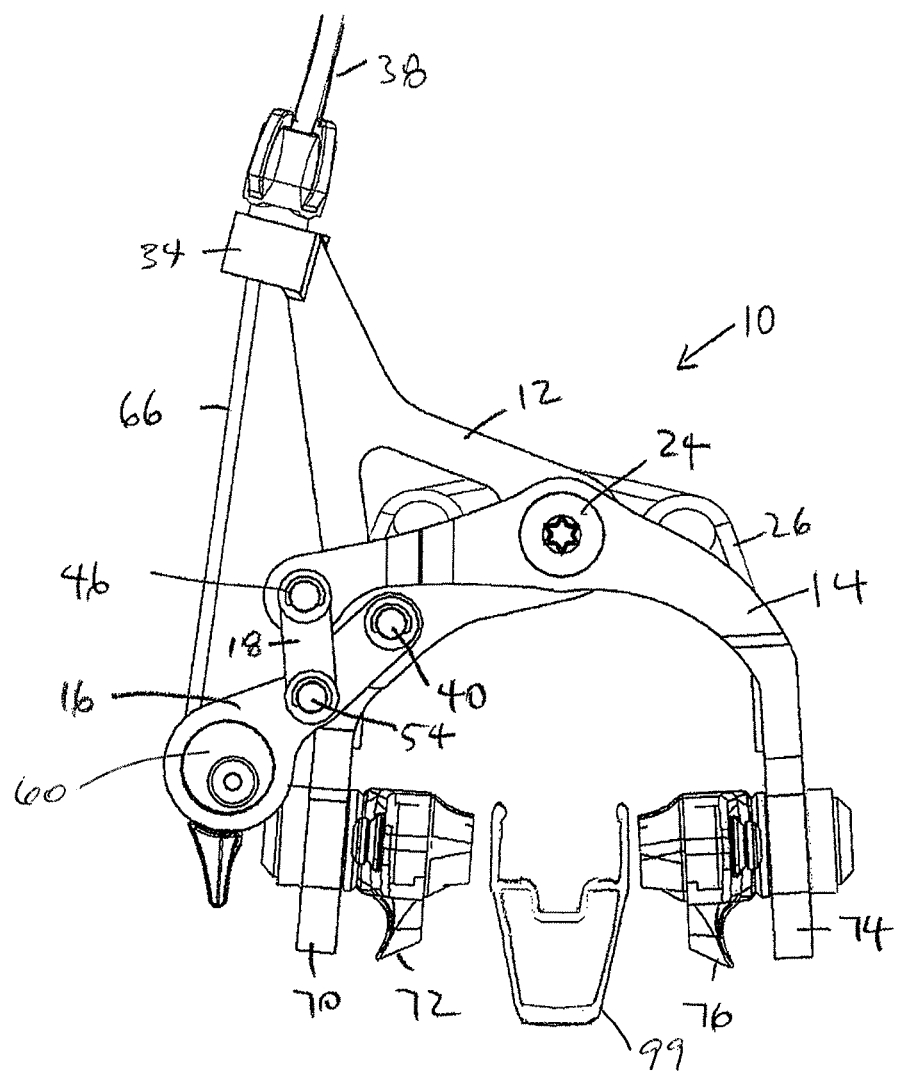
FIG. 4 is a front view of the bicycle brake in a non-actuated, non-braking position.
Figure 5:
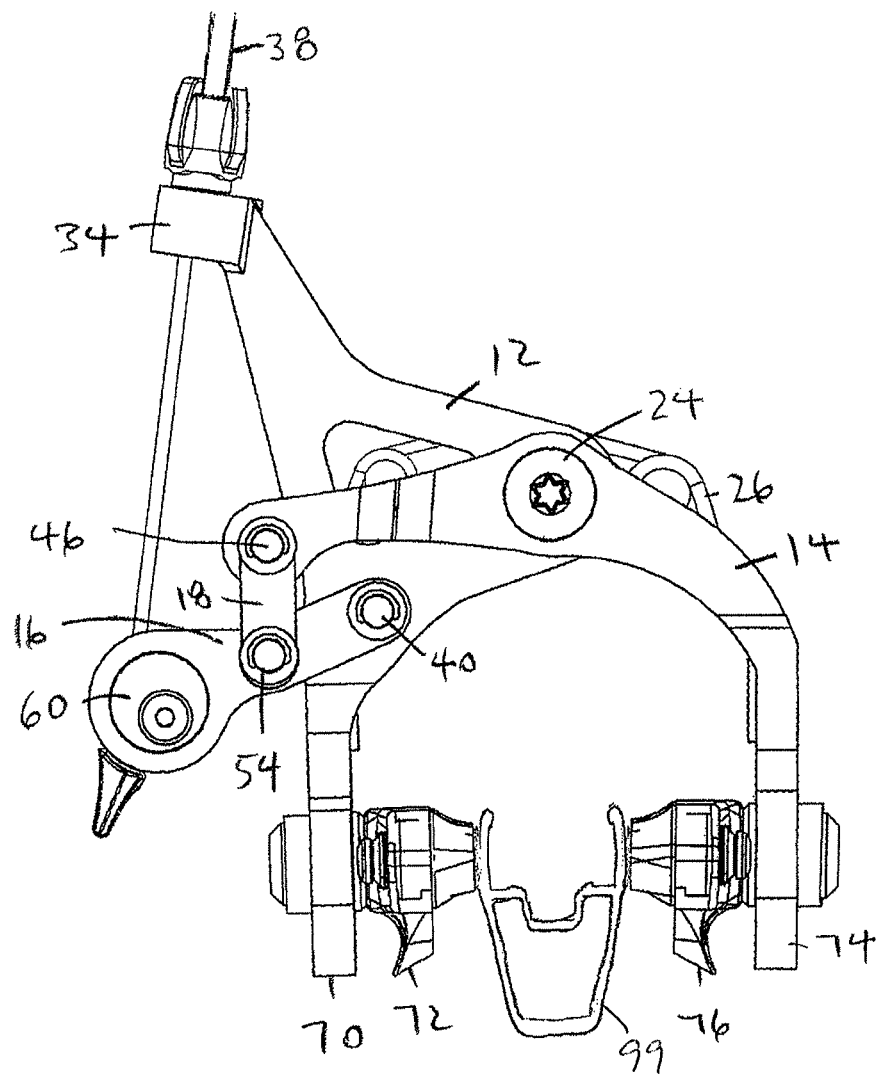
FIG. 5 is a front view of the bicycle brake in an actuated braking position.

Referring now particularly to FIGS. 4 and 5, movement of the bicycle brake 10 between a non-actuated rest position, shown in FIG. 4, and an actuated, braking position shown in FIG. 5, will be described. FIGS. 4 and 5 also schematically depict a wheel rim 99.

The brake actuation sequence is initiated by pulling on or tensioning the brake cable 66 by means of a purposed cable pulling mechanism, such as a brake lever. During actuation, the brake cable housing 38 is retained relative to the cable guide 34. The cable 66 is thus drawn upward applying the upward tensile force at the female cable bore 60. As the cable 66 is tensioned upward at the female cable bore 60, the first transfer brake arm 16 rotates clockwise about first pivot pin 40, as well as clockwise about an instant center that can be approximated by the location of the third pivot pin 54. The first pivot pin 40 allows the transfer force to the first main brake arm 12, displacing the first main brake arm 12 counterclockwise about the mounting bolt 24. This causes the brake pad 72 to move towards the wheel rim 99 supplying the wheel rim 99 with a mechanically advantageous braking force. Simultaneously, the first transfer brake arm 16 transfers a compressive force to the second transfer brake arm 18 driving it upwards, by means of the pivotal connection at the third pivot pin 54. This transfers force to the second main brake arm 14, by means of the second pivot pin 46, allowing the second main brake arm 14 to rotate clockwise about the mounting bolt 24, causing the brake pad 76 to move towards the wheel rim 99, supplying the wheel rim 99 with a mechanically advantageous braking force. When the brake lever is released, the brake tension in the cable 66 is relaxed, and the bias spring 26 biases the main brake arms 12, 14 and their respective brake pads 72, 76 apart.

Each of the first and second main brake arms 12 and 14, as well as the first and second transfer brake arms 16 and 18 can function in some embodiments as a link, so that those four elements form a linkage. Although the illustrated embodiment features pin connections between the links, other pivotal connections may be used.

Although some various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A bicycle brake actuated by a control cable, the bicycle brake comprising:
 a first main brake arm having a cable guide for receiving the control cable;
 a second main brake arm mounted for pivotable movement with respect to the first main brake arm;
 a first transfer brake arm directly pivotally connected to the first main brake arm, the first transfer brake arm having a cable anchor for receiving the control cable, the control cable extending between the cable guide and the cable anchor;
 a second transfer brake arm pivotally connected to the first transfer brake arm, and pivotally connected to the second main brake arm;
 a first pin that pivotally connects the first transfer brake arm to the first main brake arm;
 a second pin that pivotally connects the second transfer brake arm to the second main brake arm; and
 a third pin that pivotally connects the second transfer brake arm to the first transfer brake arm.

2. The bicycle brake according to claim 1, wherein the cable anchor releasably retains the control cable.

3. The bicycle brake according to claim 2, wherein the pivotal connection between the second transfer brake arm and the first transfer brake arm is disposed on the first transfer brake arm between (i) the pivotal connection of the first transfer brake arm to the first main brake arm and (ii) the cable anchor.

4. The bicycle brake according to claim 1, wherein the second transfer brake arm includes an elongated link.

5. The bicycle brake according to claim 2, wherein the control cable includes a cable housing and a brake cable slidably disposed within the cable housing, the cable guide retaining the cable housing and allowing the brake cable to extend through the cable guide to the cable anchor, the cable anchor retaining an end portion of the brake cable.

6. The bicycle brake according to claim 5, wherein the pivotal connection between the second transfer brake arm and the first transfer brake arm is disposed on the first transfer brake arm between (i) the pivotal connection of the first transfer brake arm to the first main brake arm and (ii) the cable anchor.

7. The bicycle brake according to claim 6, wherein the first main brake arm has a first end that supports a first brake shoe, and wherein the second main brake arm has a second end that supports a second brake shoe, the first and second main brake arms including first and second mounting bores, respectively, for mounting the bicycle brake to a bicycle frame, and wherein the second mounting bore is disposed between (i) the second end of the second main brake arm and (ii) the pivotal connection of the second transfer brake arm to the second main brake arm.

8. The bicycle brake according to claim 7, further comprising a fastener passing through the first mounting bore and the second mounting bore to fasten the bicycle brake to the bicycle frame.

9. The bicycle brake according to claim 1, wherein the first main brake arm has a first end that supports a first brake shoe, and wherein the second main brake arm has a second end that supports a second brake shoe.

10. The bicycle brake according to claim 9, further comprising a spring that biases the first end of the first main brake arm away from the second end of the second main brake arm.

11. The bicycle brake according to claim 1, wherein the first main brake arm has a first end that supports a first brake shoe, and wherein the second main brake arm has a second end that supports a second brake shoe, the first and second main brake arms including first and second mounting bores for mounting the bicycle brake to a bicycle frame, and wherein the second mounting bore is disposed between (i) the second end of the second main brake arm and (ii) the pivotal connection of the second transfer brake arm to the second main brake arm.

12. The bicycle brake according to claim 11, further comprising a fastener passing through the first mounting bore and the second mounting bore to fasten the bicycle brake to the bicycle frame.

13. The bicycle brake according to claim 1, wherein
the first pin passes through a first bore in the first transfer brake arm and a second bore in the first main brake arm;
the second pin passes through a third bore in the second transfer brake arm and a fourth bore in the second main brake arm; and
the third pin passes through a fifth bore in the second transfer brake arm and a sixth bore in the first transfer brake arm.

14. The bicycle brake according to claim 1, wherein the first pin, the second pin, and the third pin are substantially parallel to each other.

15. A bicycle brake for use with a control cable including a cable housing and a brake cable slidably disposed within the cable housing, the bicycle brake comprising:
a first main brake arm;
a second main brake arm mounted for pivotable movement with respect to the first main brake arm;
a first transfer brake arm directly pivotally connected to the first main brake arm; and
a second transfer brake arm pivotally connected to the first transfer brake arm, and pivotally connected to the second main brake arm,
wherein the first transfer brake arm also comprises a cable anchor that releasably retains the brake cable,
wherein the pivotal connection between the second transfer brake arm and the first transfer brake arm is disposed on the first transfer brake arm between (i) the pivotal connection of the first transfer brake arm to the first main brake arm and (ii) the cable anchor,
wherein the first main brake arm has a cable guide that retains the cable housing and allows the brake cable to extend through the cable guide to the cable anchor,
wherein the first main brake arm has a first mounting bore and the second main brake arm has a second mounting bore, a fastener passing through the first mounting bore and the second mounting bore to fasten the bicycle brake to a bicycle frame, and
wherein the first main brake arm has a first end that supports a first brake shoe, and wherein the second main brake arm has a second end that supports a second brake shoe, and wherein the second mounting bore is disposed between (i) the second end of the second main brake arm and (ii) the pivotal connection of the second transfer brake arm to the second main brake arm;
a first pin that pivotally connects the first transfer brake arm to the first main brake arm;
a second pin that pivotally connects the second transfer brake arm to the second main brake arm; and
a third pin that pivotally connects the second transfer brake arm to the first transfer brake arm.

16. The bicycle brake according to claim 15, wherein
the first pin passes through a first bore in the first transfer brake arm and a second bore in the first main brake arm;
the second pin passes through a third bore in the second transfer brake arm and a fourth bore in the second main brake arm; and
the third pin passes through a fifth bore in the second transfer brake arm and a sixth bore in the first transfer brake arm.

17. The bicycle brake according to claim 16, wherein the first pin, the second pin, and the third pin are substantially parallel to each other.

* * * * *